E. P. SMITH.
DEMOUNTABLE SPLIT RIM.
APPLICATION FILED JUNE 3, 1922.
1,436,731.
Patented Nov. 28, 1922.
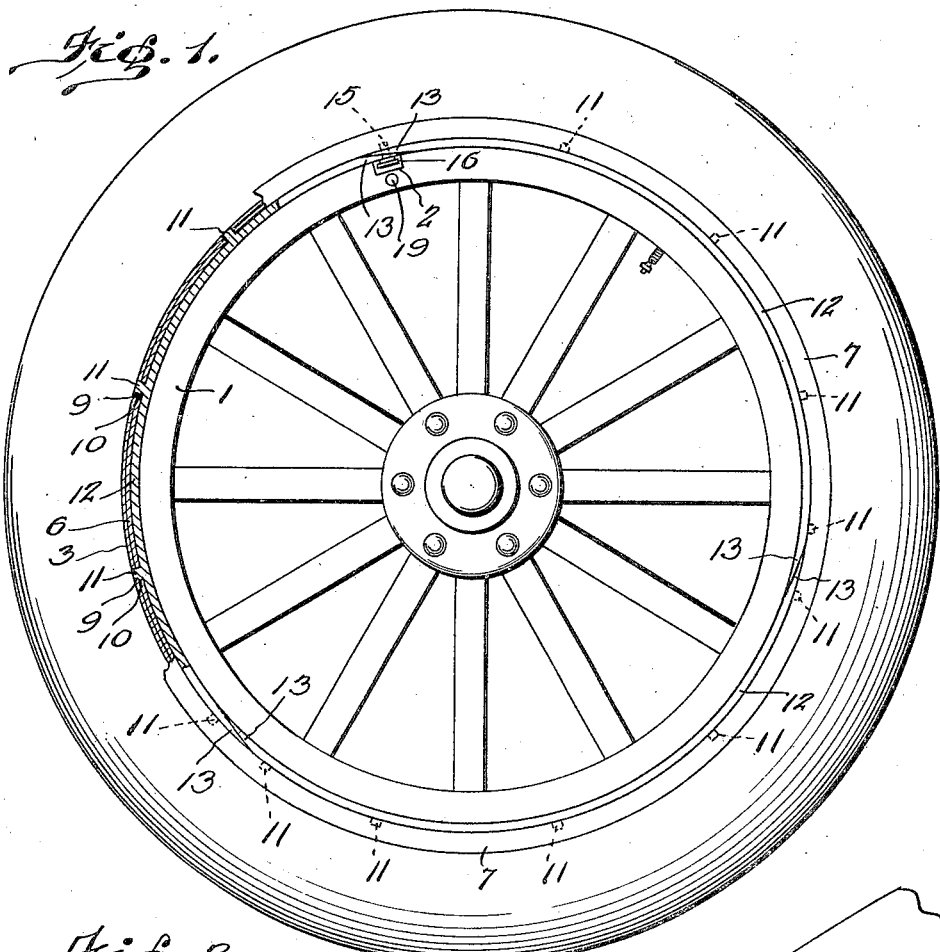
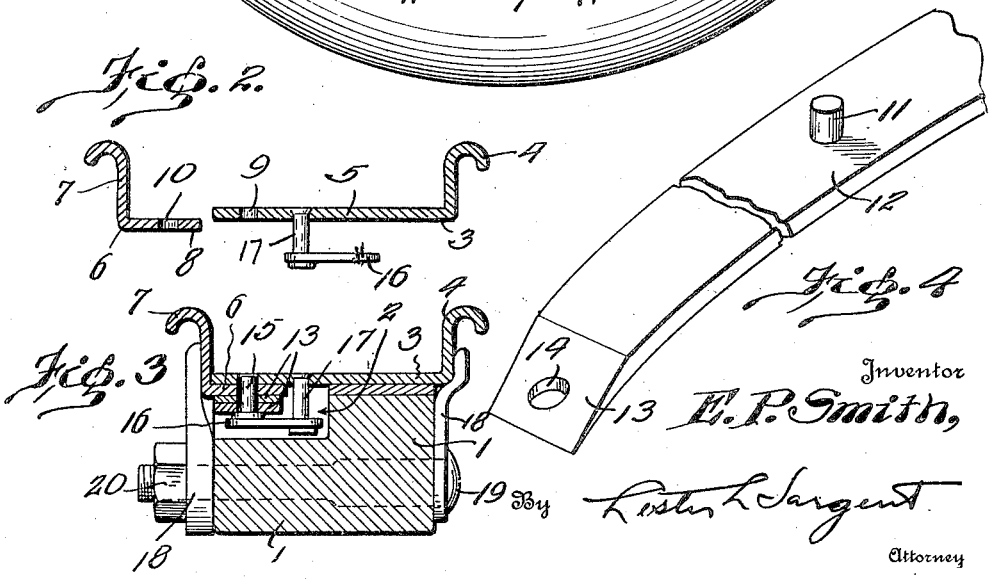

Patented Nov. 28, 1922.

1,436,731

UNITED STATES PATENT OFFICE.

ELDRED P. SMITH, OF JENKINS, KENTUCKY.

DEMOUNTABLE SPLIT RIM.

Application filed June 3, 1922. Serial No. 565,591.

*To all whom it may concern:*

Be it known that I, ELDRED P. SMITH, a citizen of the United States, residing at Jenkins, in the county of Letcher and State of Kentucky, have invented a new and useful Demountable Split Rim, of which the following is a specification.

The object of my invention is to provide an improved demountable rim which is secured in assembled position by a series of novel pin plates, and to provide the novel combination and arrangement of parts disclosed in the accompanying drawings, in which—

Figure 1 is a side elevation of my invention with the demountable rim partly in section;

Figure 2 is a transverse section of the rim parts separated;

Fig. 3 is a transverse section through the rim and felly; and

Fig. 4 is a detail perspective view of one of the pin plates.

Like numerals indicate like parts in each of the several views.

Referring to the accompanying drawings, I provide overlapping rim sections 3 and 6, the base 5 of rim section 3 having apertures 9 and the base portion 8 of rim section 6 having apertures 10 positioned to aline with apertures 9 of rim section 3 to receive the pins 15. Rim section 3 is provided with a conventional out-turned flange 4, and rim section 6 is provided with a conventional out-turned flange 7. I provide a bolt or rivet 17 mounted in the base portion 5 of rim section 3. Member 17 has a latch plate 16 swingable over and engaging the head of pin 15 where the ends of pin plate 12 overlap to hold pin 15 to its seat in openings 9, 10, and 14, as shown in Fig. 3. I provide pin plates 12 having pins 11 engaging the rim sections 6 and 3, as shown in Fig. 1. Pin plates 12, of which there are a plurality, preferably three, are provided with wedge-shaped or tapered ends 13 each end having an aperture 14 positioned to aline with the corresponding aperture of the adjacent and overlapping plate end 13.

I may provide any suitable means for holding the rim on the felly such as the conventional clamp 18, bolt 19 and nut 20, as shown in Fig. 3. The rim construction disclosed provides a rim that is easily disassembled or assembled and which requires comparatively little time for demounting the rim.

What I claim is—

In a demountable rim of the class described, the combination of split overlapping rim sections, each having apertures positioned to aline one with the other, a plurality of pin plates having pins adapted to engage inside apertures and lock the rim sections together, pin plates having overlapping ends, a latch device mounted on one of the rim sections and releasably locking the over-lapping ends of the pin plates and the rim sections in their assembled position.

ELDRED P. SMITH.